United States Patent

Watts et al.

[15] 3,696,341

[45] Oct. 3, 1972

[54] SIGNAL ANALYSIS

[72] Inventors: Robert Z. Watts; Robert L. Weiss, both of Longmont, Colo.

[73] Assignee: International Business Machines Corporation, Armonk, N.Y.

[22] Filed: Dec. 3, 1970

[21] Appl. No.: 94,661

[52] U.S. Cl. .........................340/172.5, 340/174.1 P

[51] Int. Cl. ............................................G11b 13/00

[58] Field of Search......340/172.5, 174.1 D, 174.1 P; 235/157

[56] References Cited

UNITED STATES PATENTS

| | | | |
|---|---|---|---|
| 3,417,377 | 12/1968 | Vietor et al | 340/172.5 |
| 3,417,378 | 12/1968 | Simonsen et al | 340/172.5 |
| 3,593,298 | 7/1971 | Armstrong | 340/172.5 |
| 3,587,062 | 6/1971 | Dixson Teh-Chao Jen | 340/172.5 |
| 3,465,300 | 9/1969 | Maddox et al | 340/172.5 |
| 3,490,006 | 1/1970 | Macon et al | 340/172.5 |
| 2,910,671 | 10/1959 | Best | 340/174.1 D |
| 2,737,646 | 3/1956 | Muffly | 340/174.1 P |
| 2,855,146 | 10/1958 | Henning et al. | 340/174.1 P |

OTHER PUBLICATIONS

" Need Accurate Recordings of Fast Transients? Try Disks," Electronics, Nov. 9, 1970, by R. W. Calfee, E. T. Hatley, P. Kauffman, pg. 82- 85.

*Primary Examiner*—Paul J. Henon
*Assistant Examiner*—Mark Edward Nusbaum
*Attorney*—Hanifin and Jancin and Herbert F. Somermeyer

[57] ABSTRACT

A programmable cyclic recorder selectively records signals on a plurality of analog and digital record tracks. A signal analyzer responds to an event occurring in a system being analyzed (which supplies the signals to be recorded) for stopping further recording and holding all recorded signals in the cyclic recorder. The recorded signals are then selectively read back track by track and analyzed for determining system performance. Synchronizing pulses are recorded contemporaneously with all of the tracks for accommodating a wide variety of signals. Various recording and readback circuits are provided having different signal delays. The sync signal from the sync track is delayed differing amounts in accordance with the signal delays of the various tracks to provide a constant real time signal reference to system analysis means. Synchronization of signal analysis is based upon the events which stop the recording.

7 Claims, 7 Drawing Figures

INVENTORS
ROBERT Z. WATTS
ROBERT L. WEISS
BY Herbert F. Sonnemeyer
ATTORNEY

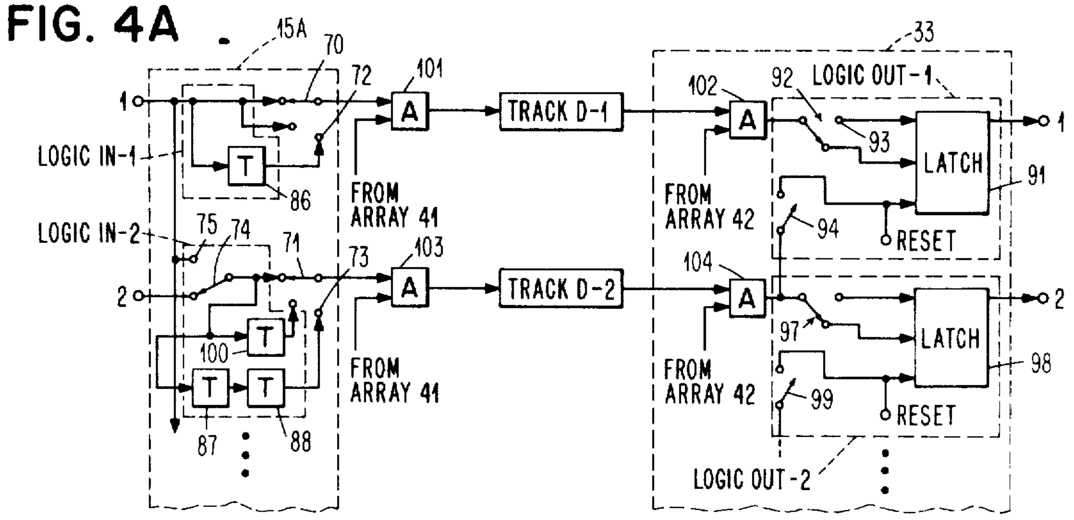
FIG. 4B
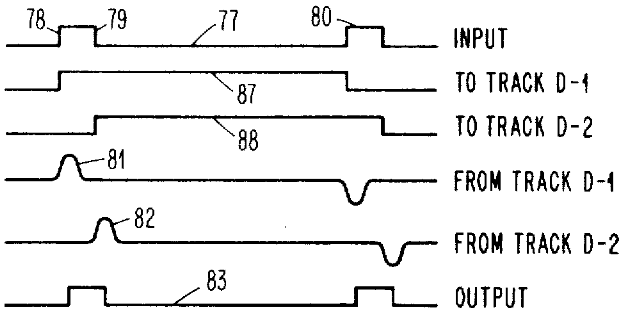
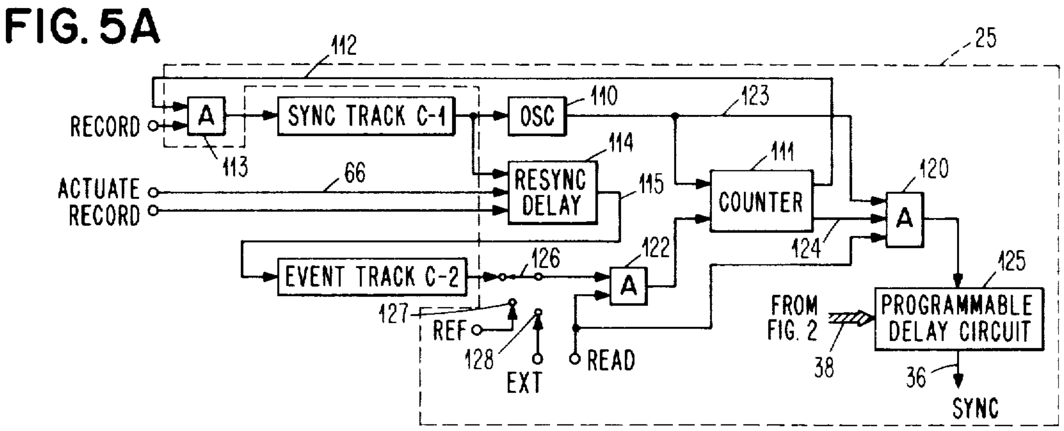
FIG. 5B
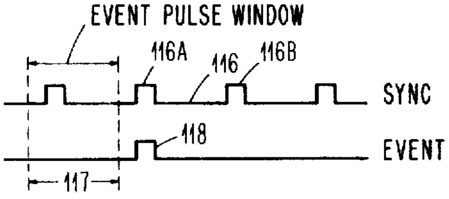

SIGNAL ANALYSIS

BACKGROUND OF THE INVENTION

This invention relates to signal analysis systems, particularly of the type for recording transient signals and later analyzing them by reading back such recorded signals.

Analyzing system performance in a digital system which in addition to digital circuits includes analog or linear circuits is a time-consuming and expensive operation. As integrated or monolithic circuits are incorporated more and more into complex digital systems, automatic diagnostic procedures become more and more advantageous. In a similar manner, auxiliary tools facilitating diagnostic procedures must become more flexible and with greater capability, and yet be provided at relatively low cost. If at all possible, such devices should be relatively portable such that the device can be transported to a machine at an operational location. For many diagnostic procedures, the sequence of operations in complex machines having both digital and linear circuits are quite different; therefore, the signal analyzer should be programmable to a large degree. An important aspect of diagnostic procedures using signal analysis techniques is a synchronization of the signals being analyzed such that proper time-frame references can be made. This should be accomplished in a simple, easy-to-adjust manner. Time perturbations introduced into the signals by the measuring instruments should be easily compensated for such that the actual time reference in the system being analyzed is easily obtainable.

SUMMARY OF THE INVENTION

It is an object of the present invention to provide an improved signal analysis system having a high degree of flexibility with facile signal synchronization means and a wide variety of signal analysis circuits for providing good flexibility in measurements.

A signal processing system using the present invention is exemplified by the inclusion of a cyclic recorder having a plurality of parallel record tracks and associated record/readback circuits. A first set of the tracks receives, records, and reproduces signals in a linear manner. A second set of the tracks receives, records, and reproduces digital signals. During the recording of signals in either the first or second set of tracks, or both, a precise oscillator records signals on a synchronization track. A signal analyzing circuit is responsive to an event occurring in the system being analyzed to stop the recording and record an event signal on a track in the cyclic recorder. During readback, control means are responsive to the event signal and to the sync signals to supply an output synchronization signal for timing the occurrence of signals in the first and second sets of tracks. Circuitry (record, readback, demodulate, etc.) associated with the various tracks may have different time signal delays introduced. In accordance therewith, during readback of signals from a given track, the output synchronization signals are delayed a predetermined amount in accordance with the signal delay introduced with the signals being reproduced from the given track.

In various versions of the present invention, two of the tracks are used simultaneously for one signal channel. Digital signals are recorded by first recording the leading transition in one track and a trailing transition in a second track and then reversing it for the next set of transitions. In this manner, peak shift problems and other related distortion problems due to frequency response of the recording system are largely obviated.

For recording trains of signals greater in length than the periodicity of the cyclic recorder, a plurality of tracks can be effectively connected one to another by switching means for effectively providing one signal channel occupying several tracks serially as the cyclic recorder passes transducing heads. Synchronization signal delays are altered as the tracks are switched in serial mode. A new method of recording serially is provided in that in the downstream tracks the current and the next period of revolution record signals for preventing glitches as the switching means switches from one track to another to make one continuous signal channel over several record tracks.

A simplified pluggable program means are provided for setting up synchronization signal delays as well as track selection, track coordination with the synchronization means, and sequence control.

The foregoing and other objects, features, and advantages of the invention will be apparent from the following more particular description of preferred embodiments of the invention, as illustrated in the accompanying drawings.

THE DRAWINGS

FIG. 4A is a simplified schematic block diagram of the so-called dual track operation of the FIG. 1 illustrated embodiment.

FIG. 4B is a set of idealized signal waveforms used to illustrate the operation of the FIG. 4A illustrated subsystem.

FIG. 5A is a simplified block diagram of a synchronization circuit usable with the FIG. 1 embodiment.

FIG. 5B illustrates a simplified set of idealized waveforms used to illustrate the FIG. 5A apparatus operation.

DETAILED DESCRIPTION

Figure 1:
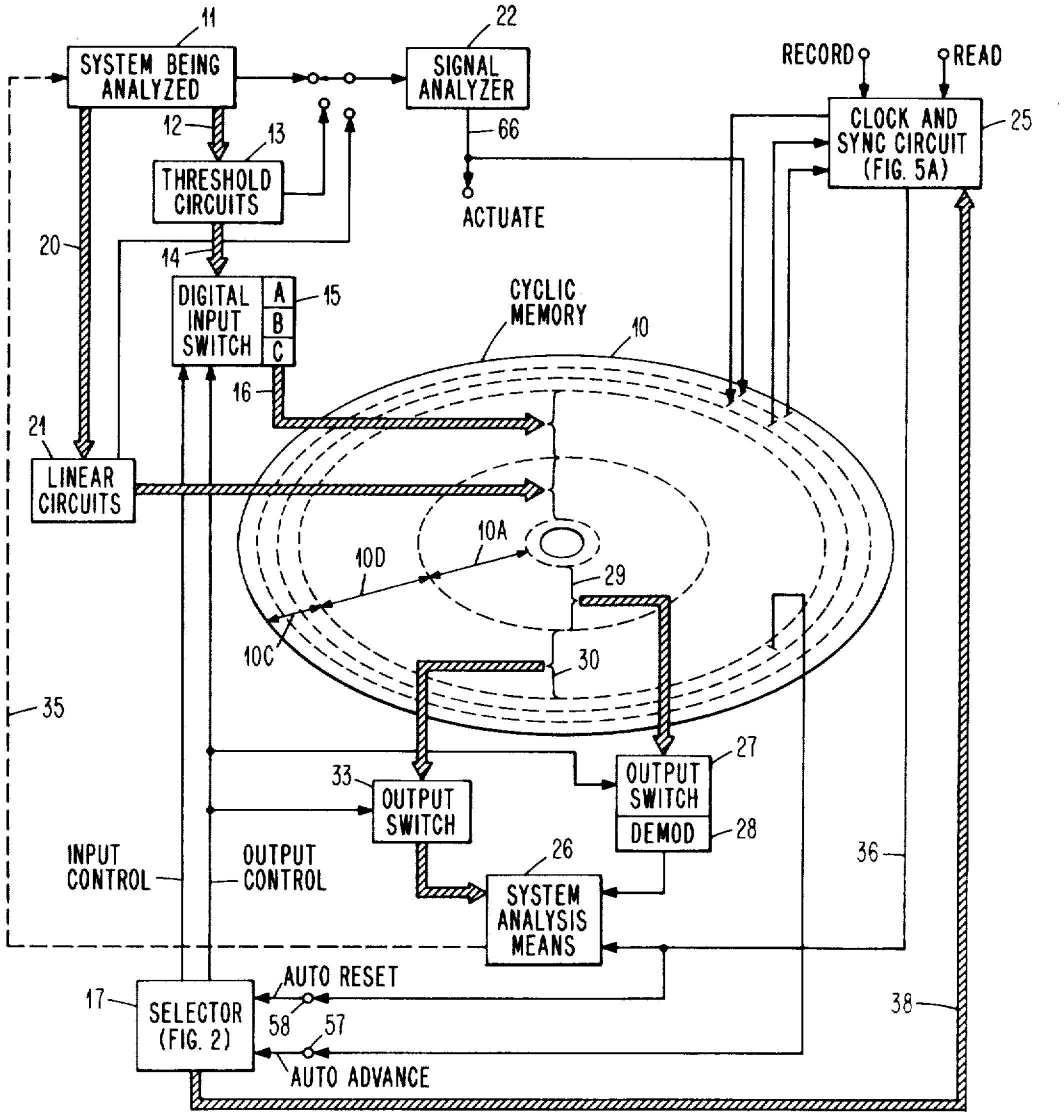
FIG. 1 is a simplified block diagram of a system illustrating the present invention.

The heart of the illustrated analysis system is cyclic memory 10 which may be a rotating disc having a magnetic oxide coating, a rotatable magnetic drum, an endless magnetically coated belt, sonic delay line, laser delay line, optical delay line, or the like. The system to be analyzed 11 can be any digital machine which includes some linear operating circuits. In the illustrated embodiment, a magnetic tape subsystem including a control unit and magnetic tape drives can be analyzed. Digital signals from the logic circuits in the system being analyzed are supplied over cable 12 to a set of threshold circuits 13. Connections between cable 12 and the system being analyzed 11 can be alligator clips, pinboard connections, and the like. Threshold circuits respond to the signals in cable 12 to supply two state signals over cable 14 to digital input switch 15 (FIG. 4*a*). Threshold circuits 13 are preferably of the amplitude responsive type, no limitation thereto intended. Examples of such circuits are found in the IBM TECHNICAL DISCLOSURE BULLETIN, Vol. 9, No. 12, on pages 1812–13, in an article by Simpson entitled, "Threshold Detector," July 1967. Other examples of suitable amplitude responsive circuits in addition to the one cited later in the specification include U.S. Pat. Nos. 2,961,642, a peak detector; 3,028,558, a pulse generator; 2,927,247, a neon driver; 3,258,609, a sine wave to pulse converter; and 3,466,471, a data bit detector for a memory.

Switch 15 then connects the signals selectively to one of a set of record tracks in memory 10. Line 16 represents the record circuits usually associated with a recording system. Switch 15 is controlled by selector apparatus 17 which is later described with respect to FIG. 2. Switch 15 is capable of switching any of the lines in cable 14 to any of the tracks in a first set of tracks 10D in memory 10. Switch 15 may be divided into portions A, B, and C for selectively combining various tracks in the set 10D as will be later described.

Analog signals within system 11 are supplied over cable 20 to linear circuits 21 for recording in a second set of tracks 10A of memory 10. In addition to the linear circuits described later in the specification, the following U.S. Patents illustrate suitable modulators and demodulators usable in connection with such recording systems: No. 2,458,315; No. 2,564,928; No. 2,574,207; No. 2,583,983; and No. 2,623,952. It is preferred that a phase or pulse width modulation scheme be used such as those set forth in the patents.

Recording is initiated with all of the tracks in sets 10A and 10D being recorded simultaneously until signal analyzer 22 responds to a predetermined event in system 11 to supply an event signal. This event signal stops recording of signals in track sets 10A and 10D. The signal analyzer 22 may be constructed as the threshold circuits 13 or may be a loss-of-amplitude detector as is widely used in tape recording systems and as later referred to in the specification.

During recording signals in tracks 10A and 10D, clock and sync circuit 25 records synchronization signals in a set of tracks 10C. In one track, a high-frequency square wave is recorded; while in the second track, the event signal is recorded. Additionally, cyclic memory 10 may have a reference signal permanently recorded in a third track which serves as a fiducial or reference mark for the memory and is used as later described.

During readback of signals, the recorded high-frequency signals by circuit 25 is used as a synchronization for system analysis means 26. These signals coordinate circuit operation such that the presentation and analysis of signals from tracks 10A and 10D are in real-time coincidence. The analog signals recorded in set of tracks 10A are supplied through an output switch 27 under control of selector 17. A single demodulator 28 converts the analog signals from the biased recording techniques effected through linear circuits 21 to the original signal waveform. Demodulator 28 supplies its output to system analysis means 26 for analytical operations. As shown, a single demodulator operates with set of tracks 10A. Output switch 27 selectively connects one of the tracks through a set of readback heads diagrammatically illustrated by bracket 29 to signal demodulator. It is understood that additional demodulators may be used with a different output switching configuration.

The digital signals in set of tracks 10D are similarly read out through readback heads 30 to digital output switch 33 which is similarly controlled by selector 17. The switch digital signals are then supplied to system analysis means 26. Output switch 33 is capable of operating two tracks of a single channel or serializing a set of tracks or will be explained later with respect to FIGS. 2 and 4A.

System analysis means may be an oscilloscope within a manually operated test station. X-Y plotters may be used. It also may be a general purpose digital computer programmed to receive digital signals converting same into numerical form for numerical analysis. The analog signal from demodulator 28 can be converted in an analog-to-digital converter into digital form on time-sampling bases. The system analysis means through manual intervention automatically can control the system being analyzed 11 as indicated by dash line 35. Based upon analysis performed in 26 as a function of the signals read back from cyclic memory 10, the operator or the computer may change the operation state of system 11. Then, a second set of waveforms are recorded in cyclic memory 10 and subsequently analyzed. This procedure may be followed with the analysis being directed to different signals in accordance with the operational states of system 11 or in accordance with the analysis of signals from one track or another.

Synchronization signals from clock and sync circuit 25 are read from the cyclic memory 10 and converted into an output synchronization signal in delayed form for compensating for signal delays as will become apparent. The real time or output synchronization signal supplied over line 36 synchronizes the operation of means 26. It may also be used as an input to selector 17 as a reset as will become apparent. The reference pulse supplied from the clock track in cyclic memory 10 is also a selective input to selector 17 as an automatic advance as will be explained with respect to FIG. 2. Selector 17 has a preprogrammed set of delays for operation of the output sync signal supplied over line 36. A set of digital signals supplied over cable 38 by selector 17 controls a programmable delay line in sync circuit 25 for altering the time of occurrence of an output sync signal on line 36. Further delays can be provided by preset counter means as will be described such that any portion of the signals recorded in any track can be observed and analyzed in real-time synchronization; either simultaneously or with predetermined time delays.

Figure 2:
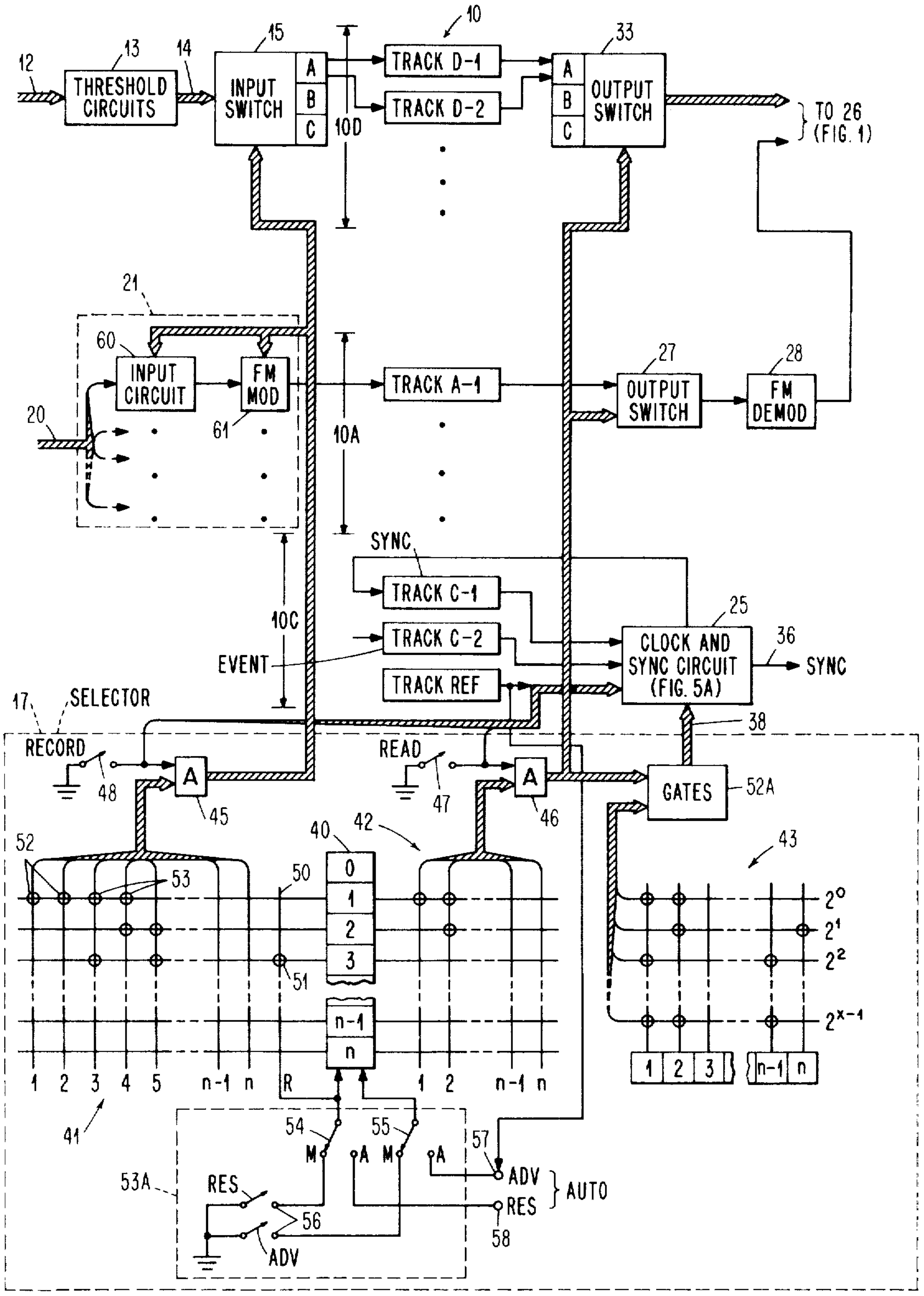
FIG. 2 is a combined diagrammatic and schematic diagram of a portion of the FIG. 1 embodiment, particularly relating to control aspects of the embodiment.
Figure 3A:
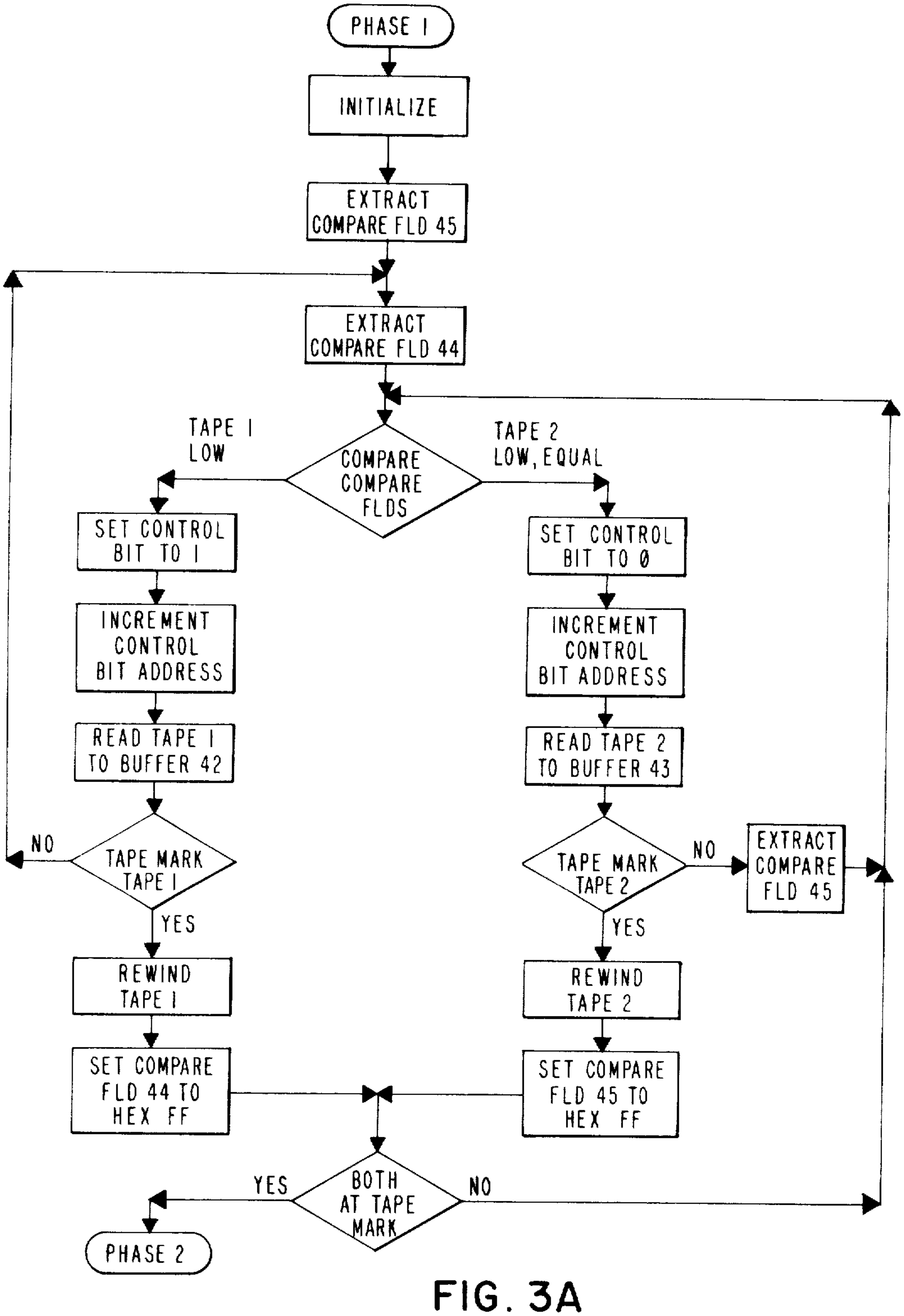

Referring next more particularly to FIG. 2, selector 17 and its operating relationships with the circuits associated with cyclic memory 10 is shown in somewhat greater detail. Selector 17 basic components include ring counter 40 sequentially actuating two sets of pluggable coordinates 41 and 42. A third set of pluggable coordinates 43 select the synchronization timing delay referred to above. Ring counter 40 sequences operations by stepping actuating lines in coordinate systems 41 and 42. Two sets of AND circuits 45 and 46 select whether a record operation or a readback operation is to be performed with respect to cyclic memory 10. The read and record selection switches 47 and 48 are shown as manually actuated switches for convenience. Position 0 of ring counter 40 is a home position under which no activity is permitted in the illustrated system. Disabling AND circuits 45 and 46 may be used as a substitute therefore; however, it is convenient to have a disabling position in ring counter 40. Each of the coordinates are effectively sets of crossed insulated conductors which may be selectively electrically interconnected by the insertion of a plug in a hole (not shown). Such plug insertion provides an electrical connection between crossed conductors at that coordinate point. Isolating diodes (not shown) are provided in each coordinate array for preventing sneak circuits. Such isolation in selection arrays is well known and is not further described for that reason. Array 41 includes reset line 50 which is operative to reset the ring counter to the zero position. As shown, plug 51 connects stage 3 of ring counter 40 for resetting. The ring counter may be automatically advanced as later described going through steps 1, 2, and then 3 in sequence. Upon occurrence of step 3, an actuating signal is supplied to line 50 resetting ring counter 40 to its home position. Upon automatic advance, the sequence is repeated until stopped. Under manual advance, each step is manually actuated with resetting occurring as above described.

Actuation of input switch 15 by the conductors in array 41 is by the insertion of plugs in the track lines 1 through X as shown. Tracks D1 and D2 in the illustrative embodiment are connected to provide one channel of recording. Recording occurs during phase 1 of ring counter 40. Accordingly, plugs 52 are inserted as shown for actuating input switch 15 to provide connections between threshold circuits 13 to tracks D1 and D2 (FIG. 4A).

Tracks 3, 4, and 5 are plugged in array 41 to provide a single channel of recording. Plugs 53 effect recording digital signals in tracks D3 and D4 (not shown) during phase 1 of ring counter 40. When ring counter 40 advances to phase 2, recording continues in track D4 but is stopped in track D3; recording is also initiated in track D5. Simultaneous recording in tracks D3 and D4 permits a more continuous record of the digital signal in that, as ring counter 40 advances phase, there is a slight time delay. This slight time delay without the simultaneous recording during the earlier phase would provide a blank spot in track D4, i.e., the succeeding record track, possibly obliterating an event or a signal related to an event which may be of interest. Accordingly, a more continuous form of recording is provided by simultaneously recording in a preceding track and then recording only in one of the two tracks in a succeeding phase of recording. Similarly, during phase 3, only track D5 is recorded in, while track D4 has been turned off. Therefore, in tracks D3–D5, there is a continuous record provided recorded during phases 1, 2, and 3 of ring counter 40 operation.

To provide a cyclic channel in the three tracks D3, D4, and D5, another plug is placed in track D3 line at phase 3. This channel has a periodicity of three times that of cyclic memory 10.

Coordinate array 42 controls the readback operation and operates identically to the input coordinate array 41. The same plugging arrangement effects dual track single channel and serial track for readout as for recording. AND circuits 46 transfer the actuating signals from array 42 to output switches 33 and 27 as well as to gates 52A for selectively supplying digital numbers from coordinate array 43 to clock and sync circuit 25. Array 43 has one vertical line for each of the tracks in cyclic memory 10. Plugs are inserted connecting the track signal-actuating lines 1 through X to the digit position lines $2^0$ through $2^{x-1}$. As shown for track 1, digit positions $2^0$, $2^2$, and $2^{x-1}$ are activated for supplying a number to a programmable delay line (later described) in clock and sync circuit 25 for delaying the line 36 sync signal in accordance with that digital number. In a similar manner, track 2 signals have the sync signal on line 36 delayed a different amount. The electrical circuits (read, record, etc.) associated with cyclic memory 10 having the shortest delay of all tracks require no delay of sync signal 36. This is shown as occurring in track 3. In this manner, the synchronization signal on line 36 is delayed an amount proportional to the differences in delay of the various electronic circuits in the various tracks with respect to the track circuits having the shortest delay.

Returning now to sequence control ring 40, its operation is controlled by circuit 53A for advancing and resetting. If plug 51 is removed from reset line 50, then circuit 53A has complete control over the ring. Otherwise, the control is subject to the positioning of a plug on the reset line. Circuit 53A includes a pair of switches 54 and 55 respectively controlling reset and advance. At position M, ring reset and advance is manually controlled by a set of independent switches 56. For automatic control, switches 54 or 55 are set to the A position connecting the inputs of ring 40 to automatic input terminals 57 and 58. These automatic input terminals may be connected to any portion of the illustrated circuits, the portion of the system being analyzed, or other external control circuits. As shown in FIG. 1, no limitation intended, automatic reset terminal 58 receives sync signal 36 such that ring 40 is reset each time the event pulse as delayed by sync circuit 25 is sent to system analysis means 26. Other signals can be used with equal advantage.

A common use of the reference pulses is automatically advancing ring 40 for decommutating the serially recorded channels as previously described. Each time the reference signal is detected, ring 40 advances. For serially recorded tracks 3, 4, and 5, phase 1 could be used to read off tracks 3 and 4, phase 2 to read tracks 4 and 5, and phase 3 to read off tracks 5 and 3. Advancing is in accordance with the reference signal. Sync circuit 25 delays the sync pulse in accordance with the delays of the respective tracks as coordinate array 42 is selectively sequenced by ring 40. Gates 52A then commutate different time delays from array 43 to clock and sync circuit 25 such that actual presentation of the signals read off from the cyclic memory 10 appear to occur at the same time irrespective of the varying delays in electronic circuitry associated with the various tracks. This is a significant advantage of the present system in that it provides real-time stability to means 26.

Recording signals in tracks 10A and 10D use bias techniques to provide a "destructive write." For example, linear circuits 21 may consist of an array of input circuits such as circuit 60. Such circuits may include linear amplifiers, impedance matching circuits, and the like. They may also include time-sampling circuitry. Such circuits are activated from the selector 17 as previously described for the input switches. The output of circuit 60 is FM modulated by modulator 61 in a known manner for recording in one of the tracks in set 10A. Using FM carrier recording is well known and not further described for that reason. When using this recording technique by modulating the signal to be recorded on a carrier, there is an automatic erase operation occurring such that any previous recordings are obliterated with the input signal being recorded in the track.

Clock and sync circuit 25 records the synchronization circuit in track C1 and the event signal in track C2 as shown in FIG. 1. The track reference also supplies its output pulse to clock and sync circuit 25. The read and record activating signals provided by switches 47 and 48 are also supplied to the clock and sync circuit 25 and used as will be described with respect to that portion of the disclosure.

Figure 3:
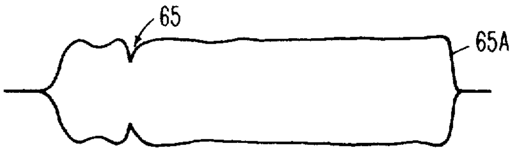
FIG. 3 is a simplified idealized illustration of a readback signal showing an event on which the system may be actuated.

Referring next to FIG. 3, an idealized and simplified readback waveform from one of the tracks 10A is shown. Such a readback signal is typical of the readback envelope of a digital recorded magnetic tape. It is desired in magnetic tape systems to have a certain level of readback signal. Imperfections in the media cause a substantial reduction in the readback signal which may cause loss of information. Such a loss of amplitude, such as at point 65, can be used as an event in system 11 for stopping recording. For more complete analysis, detection of a read error at 65A through data error detection circuits in system 11 stop recording. In this manner, the entire signal, especially signals about point 65, can be carefully analyzed during playback. Signal analyzer 22 then takes the form of a loss of pulse envelope responsive circuit connected to error detection circuits in system 11 for supplying an actuating signal over line 66. Cyclic recorder 10 then captures all of the signals shown in FIG. 3. Other events in system 11 may also be used. For example, in the arithmetic circuits, loss of a carry or supplying of a carry at predetermined times may indicate that certain functions are being improperly performed. Other signals occurring at different times in accordance with functions being analyzed are also usable and detectable by various forms of signal analyzers which are beyond the scope of the present invention and are not further described for that reason.

Signal analyzer 22 supplied event signal automatically stops recording. As shown in the present embodiment, readback of the captured signals is manually actuated; however, within the scope of the present invention, automatic actuations in response to actuating signals in line 66, i.e., the recording of the event, may effect readback of the signals automatically upon the next revolution of cyclic recorder 10. Having described the control features of the present invention, we will now turn to the description of the dual-track operation and synchronization recording as well as the important aspect of altering the time of occurrence of the synchronization signal during playback of signals from cyclic memory 10.

Referring firstly to FIGS. 4A and 4B, the dual-track, single-channel operation, as well as the serial operation among a plurality of tracks, is described. FIG. 4A shows but two track circuits in simplified form capable of either dual-track or serial-track operation. As shown, any two tracks in track set 10D may be used in combination as dual tracks. Also, all of the tracks in set 10D may be connected serially in accordance with the showing in FIG. 4A. As a practical matter for cost-reducing purposes, it may be desired to limit the flexibility of the record and readback circuits with respect to tracks 10D. For example, input digital switch 15 and output switch 33 may be divided into three sections--A, B, and C. The interconnection capabilities may be limited to these sections. For example, all of the tracks in section A may be connected in serial to form one channel having a latency time equal to the sum of the latency time of the individual tracks and similarly for sections B and C. Also, any of the tracks within sections A, B, or C may be connected together to form a single recording channel. Another cost-reducing factor is the use of odd-numbered tracks with the next higher-numbered/even-numbered track as a single-channel two-track recording scheme. This would reduce the amount of logic switching circuitry somewhat.

Turning now to FIG. 4A, input digital switch section 15A is shown in part as is a portion of output switch 33 section A. The switches are arranged in open-end fashion; that is, the highest-numbered track circuit cannot be connected to the lowest-numbered track circuit for completing a continuous loop recording channel. Such a connection can be easily accomplished based upon the teachings in FIG. 4A. Logic IN-1 circuit connects input 1 to track D1. Switch 70 is ganged to switch 71 connected to logic circuit IN-2. In the illustrated switch positions, tracks D1 and D2 are independently operated tracks.

For dual mode or dual track operation, wherein tracks D1 and D2 form a single signal channel, switches 70 and 71 are actuated to terminals 72 and 73, respectively. Input switch 74 is actuated to terminal 75. A signal supplied to terminal 1 is then applied to both logic circuits IN-1 and IN-2. The leading input signal 77 (FIG. 4A) includes pulses of such a duration that they cannot be faithfully reproduced on either tracks D1 or D2. For increasing the frequency response of cyclic memory 10, the first-occurring signal transition 78 is recorded as a transition in track D1. The second-occurring transition 79 is recorded in track D2 as a single transition. The next-occurring short-duration pulse 80 is similarly recorded. Note that the direction of transitions or signal-state changes in tracks D1 and D2 have no significance. Upon readback, detection of signals 81 and 82, respectively from tracks D1 and D2, results in the generation of output signal 83 as will be described.

In logic circuit IN-1, a binary trigger 86 is responsive to all positive-going transitions in the input signal 77. Its output signal is supplied to terminal 72 for recording in track D1 as signal 87. The input signal on line 1 is also supplied through inverter 87A to binary trigger 88. Trigger 88 responds to the inverted signal of input 77 for generating recorded signal 89 at terminal 73.

Readback and reconstruction of the recorded signal is accomplished by logic-out circuit 1 and logic-out circuit 2 within output switch 33. In logic-out 1 circuit, latch 91 is set to active condition whenever the output signal of track D1 has a transition. This is accomplished by actuating switch 92 to terminal 93. Otherwise, the output signals of track D1 are supplied to the toggle input of latch 91 such that it acts as a binary trigger. The output of track D2 is supplied through switch 94 to the reset input of latch 91. A manual reset may also be applied to the same line for initializing operations as is known. Readback signal 81 from track D1 is supplied to set latch 91 while the signal transitions from track D2 reset the latch to construct output signal 83 faithfully similar to input signal 77. Note that the frequency response of tracks D1 and D2 may be substantially less than that required for recording pulses 79–80 in a single track.

Track D2 and track D3 (not shown) may be connected in a similar manner by setting switch 71 to terminal 96 and connecting track D3 as described for track D2. In such a situation, track D1 would not be connected to track D2. Switch 74 would be as shown, while output switch 97 would be actuated to connect the output of track D2 to the set input of latch 98. Switch 99 would be closed for receiving a signal from track D3. Binary trigger 100 would operate in the same manner as binary trigger 86.

AND circuits 101–104 are selectively actuated in switch 15 by connection to the activating lines shown in coordinate array 41, while output switch 33 is selectively actuated by similar plugs in array 42. Note that for dual-track operation, plugs 52 must both be placed in the same phase line for tracks D1 and D2. Output array plugs are connected in a similar manner. AND circuits 101–104 may actually be gated amplifiers within the recording and readback circuits of cyclic memory 10. Such devices are well known and are not further described for that reason.

Referring next to FIGS. 5A and 5B, the synchronization aspect of the present embodiment is described. Primary synchronization is provided by phase lock oscillator 110 receiving synchronizing signals from sync track C1. It supplies its signals to counter 111 which counts down in accordance with preset values. An output signal is supplied over line 112 to record actuated AND circuit 113 to sync track C1. Frequency supplied to track C1 may be one megacycle, for example. The actuate signal from signal analyzer 22 supplied over line 66 to resync delay circuit 114 is synchronized by signals read back from sync track C1. Resync delay circuit 114 may be a pair of latches interconnected together such that the output signal on line 115 is in synchronism with the first-occurring pulse from sync track C1 after receipt of the actuate signal on line 66. This is accomplished as shown in FIG. 5B. Sync pulses 116 occur periodically. The event represented by actuate signal may occur in pulse window 117. Resync delay circuit 114 will then supply an event pulse 118 in synchronism with the first-occurring sync pulse 116A after receipt of the actuate pulse or after occurrence of the event. Event pulses occurring before 116A, but after the window, will be synchronized to sync pulse 116B. Record signal actuates resync delay by enabling AND circuits therein. Such an arrangement is so well known that it need not be described.

Upon readback of signals from cyclic memory 10, AND circuits 120 and 122 are enabled for operation. Oscillator 110 is frequency locked to the output of sync track C1. Thereby, oscillator 110 operation follows velocity variations of the cyclic memory and, therefore, more closely reproduces an accurate time frame representative of the recording time frame irrespective of such velocity variations. Its output signal again actuates counter 111. Counter 111 is preset such that a predetermined number of pulses after the event pulse 118 occurs to effect a presentation of the signals and analysis in means 26 as will become apparent. AND circuit 120 is jointly responsive to an oscillator 110 output pulse on line 123 and to counter 111 reaching the preset value as indicated by an activating signal in 124 and the read enable signal to supply a pulse to programmable delay circuit 125. Programmable delay circuit may be a counter circuit having a number of counts determined by the binary signals supplied over cable 38 as previously mentioned. The control of such counters is well known and is not described. The output of delay circuit 125 is supplied over line 36 as an output synchronizing pulse to means 2 6.

Event track C2 is scanned by the read head with the output signal being supplied through switch 126, thence through AND circuit 122 to reset counter 111. Resetting counter 111 provides a reference in counter 111 based upon the occurrence of the event which stopped the recording. In this manner, setting counter 111 provides the operator with an indication of the time domain at which the operator is examining signals read back from cyclic memory 10. Counter 111 is manually adjustable to select any delays equal to a maximum of the period of rotation of cyclic memory 10. Resetting counter 111 may be by the reference pulse supplied to terminal 127 or by an external means at terminal 128. It is preferred, however, that the output synchronization signal be keyed to a signal recorded within cyclic memory 10. For example, terminal 128 may be connected to one of the tracks in set 10D.

While the invention has been particularly shown and described with reference to preferred embodiments thereof, it will be understood by those skilled in the art that various changes in form and details may be made therein without departing from the spirit and scope of the invention.

What is claimed is:

1. A signal-processing system including in combination:

a cyclic recorder having a plurality of parallel record tracks with associated record and readback circuits and including signal-processing operations means effecting different time delays in the respective track circuits, a first set of said tracks constructed to record and reproduce signals in a substantially linear manner, a second set of said tracks having associated record/readback circuits for recording and reproducing signals as a succession of signal-state changes, timing means including frequency control means for generating timing signals of a predetermined frequency, timing recording means receiving said timing signals and recording same on a timing track in said cyclic recorder whenever any recording operations are performed in either of said sets of tracks, a signal analyzer responsive to the predetermined signal condition and supplying an event signal, readback control means effecting readback of said timing track for actuating said timing means to provide timing signals in accordance with the frequency reproduced from said timing track and further operative to effect selective readback of signals from any of said tracks in said sets and when so selecting, said readback control means including programmable timing delay means receiving said timing pulses from said timing means and supplying a synchronization signal delayed in accordance with the signal delay in the record/reproduce circuits of the track being read out, and utilization means jointly responsive to the signal being read from said track and to said delay synchronization signal to provide a real-time indication of said recorded signal.

2. The system set forth in claim 1 wherein two of said tracks in said second set of tracks for recording high-frequency signals as a signal transition in a first one of said tracks followed by a signal transition in a second one of said tracks and said record/reproduce circuit means being switchable to effect said operation or to record in said tracks independent of one of the other.

3. The system set forth in claim 2 wherein said input switching means comprises a pair of switches actuable between first and second positions and in said first position, said switches coupling first and second terminals to a record track, a third switch selectively connecting said first or second terminal to a second switching circuit, trigger means in a first switching circuit responsive to two signal-state changes to provide one signal-state change output and having an output connected to said second position of said first switch and said second switching means including inverting means connected to said third switch for receiving signals from said first terminal and inverting same and circuit means responsive to the output of said inverter means for supplying one signal-state change for two signal-state changes received and connected to said second switching means second position, and output switching means connected to both said tracks and including fourth switching means selectively connecting the output of said first track to a first position and/or to a second position, latch and binary trigger means having a trigger input connected to said second position of said fourth switch and a set input connected to said second position of said fourth switch and switching means selectively connecting the output signals of said second track to the reset inputs of said latch.

4. The system set forth in claim 1 including input switching means interposed between a set of input terminals and said record circuits for said second set of tracks, sequence control means responsive to rotations of said cyclic memory for initiating a series of recording phases, and said input switch being responsive to successive ones of said recording phases to selectively switch input signals received over a terminal to succeeding pairs of tracks in said set of tracks.

5. The system set forth in claim 1 including a selector having a plurality of control arrays of crossed insulated conductors which are interconnectable for providing a crosspoint program set of connections, a ring counter supplying actuating signals to conductors in one coordinate of two of said arrays in accordance with the signal state of said ring, input switching means selectively connecting a set of input terminals to one of said tracks in said second set and a second switching means selectively connecting the output signals of said tracks to said control means and a second output switch connecting said tracks in said first set to a single line, demodulator means for converting the outputs of said output switch to another form for supplying a signal through said control means, crossing conductors to said first coordinate in said first array connected to the ring counter being selectively connectable to said input switch for selectively connecting input terminals to one of said tracks in said second set in accordance with the programs set forth in said array and a second set of crossing conductors selectively connectable to the first conductors in said second array for controlling said output switches in accordance with the program interconnections therein, a third set of coordinate arrays having preprogrammed time delays therein in accordance with numerical significances and selectively gated in accordance with said second array connections for supplying numerical indications of delays of any track actuated in said output switches, and said timing means being responsive to said numerical signals to delay said sync signal a time in accordance therewith.

6. The system set forth in claim 5 event signal, further including an event track on said cyclic memory receiving said event signal from said signal analyzer for recording and said timing means receiving said event signal from said cyclic memory during readback of any of said tracks and generating a synchronization signal based upon said event signal as a time reference including delay means for selectively supplying a sync signal in time synchronism with any portion of any signal recorded in said cyclic memory.

7. A signal processing system including in combination:

a cyclic recorder having a plurality of parallel record tracks with associated recorded readback circuits and including signal processing means exhibiting different signal delays in respective circuits associated with said tracks;

a set of said tracks having associated circuits constructed to record and reproduce signals in substantially linear manner;

timing means including frequency control means for generating timing signals of a predetermined frequency;

timing recording means receiving said timing signals and whenever any recording operations are performed in said set of tracks, recording same on a timing track in said cyclic recorder;

readback control means effecting signal readback from said timing track for actuating said timing means to provide timing signals in accordance with the frequency reproduced from said timing track and operative to effect readback from one track in said set of tracks;

programmable timing delay means controlled by said readback control means and receiving said timing pulses for supplying a synchronizing signal delayed in accordance with a delay in the record/reproduce circuits of the track being read out from; and means jointly responsive to the linear signal being read from said track and to the delayed synchronizing signal to provide a real-time linear indication of the reproduce signal having a time base substantially similar to the time base of the signal before recording, which is independent of velocity variations of said cyclic recorder.

* * * * *

PO-1050
(5/69)

UNITED STATES PATENT OFFICE
CERTIFICATE OF CORRECTION

Patent No. 3,696,341 Dated October 3, 1972

Inventor(s) Robert Z. Watts and Robert L. Weiss

It is certified that error appears in the above-identified patent and that said Letters Patent are hereby corrected as shown below:

Column 12, line 41, delete "event signal".

Delete Sheet 3 of the drawings.

Signed and sealed this 1st day of May 1973.

(SEAL)
Attest:

EDWARD M. FLETCHER, JR
Attesting Officer

ROBERT GOTTSCHALK
Commissioner of Patents